(12) United States Patent
Chono

(10) Patent No.: US 9,521,409 B2
(45) Date of Patent: Dec. 13, 2016

(54) VIDEO ENCODING DEVICE, VIDEO ENCODING METHOD, AND PROGRAM

(71) Applicant: NEC Corporation, Tokyo (JP)

(72) Inventor: Keiichi Chono, Tokyo (JP)

(73) Assignee: NEC Corporation, Tokyo (JP)

( * ) Notice: Subject to any disclaimer, the term of this patent is extended or adjusted under 35 U.S.C. 154(b) by 140 days.

(21) Appl. No.: 14/359,949

(22) PCT Filed: Nov. 12, 2012

(86) PCT No.: PCT/JP2012/007222
§ 371 (c)(1),
(2) Date: May 22, 2014

(87) PCT Pub. No.: WO2013/076929
PCT Pub. Date: May 30, 2013

(65) Prior Publication Data
US 2014/0314154 A1    Oct. 23, 2014

(30) Foreign Application Priority Data
Nov. 24, 2011    (JP) .................................. 2011-256503

(51) Int. Cl.
*H04N 19/51*    (2014.01)
*H04N 19/523*    (2014.01)
*H04N 19/59*    (2014.01)

(52) U.S. Cl.
CPC ...... *H04N 19/00739* (2013.01); *H04N 19/523* (2014.11); *H04N 19/59* (2014.11)

(58) Field of Classification Search
CPC ..... H04N 19/176; H04N 19/51; H04N 19/513
See application file for complete search history.

(56) References Cited

U.S. PATENT DOCUMENTS

2004/0076333 A1*    4/2004    Zhang ................. H04N 19/197
382/238

FOREIGN PATENT DOCUMENTS

| JP | 2003-219426 | 7/2003 |
| JP | 2005-303994 | 10/2005 |
| JP | 2011-517241 | 5/2011 |

OTHER PUBLICATIONS

Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11 6th Meeting: Torino, IT, Jul. 2011.

(Continued)

*Primary Examiner* — Joseph Ustaris
*Assistant Examiner* — Zhubing Ren
(74) *Attorney, Agent, or Firm* — Finnegan, Henderson, Farabow, Garrett & Dunner LLP

(57) ABSTRACT

A video encoding device uses fractional pixel accuracy motion compensation prediction based on a DCT interpolation filter, and includes: a fractional pixel accuracy motion vector search unit 10 for estimating a fractional pixel accuracy motion vector using an interpolation filter 11 different from a DCT interpolation filter 21; and a fractional pixel accuracy motion compensation prediction signal updating unit 20 for updating a prediction signal of a position of the fractional pixel accuracy motion vector estimated by the fractional pixel accuracy motion vector search unit 10, with a prediction signal based on the DCT interpolation filter 21.

3 Claims, 9 Drawing Sheets

(56) References Cited

OTHER PUBLICATIONS

Kenji Kondo et al., "CE3: Reports on MC boundary filter", Joint Collaborative Team on Video Coding (JCT-VC) of ITU-T SG16 WP3 and ISO/IEC JTC1/SC29/WG11, 6th Meeting: Torino, IT, Jul. 2011.

Ken McCann et al., "Samsung's Response to the Call for Proposals on Video Compression Technology", Joint Collaborative Team on Video Coding (JCT-VC) of ITU-T SG16 WP3 and ISO/IEC JTC1/SC29/WG11 1st Meeting: Dresden, DE, Apr. 2010.

Elena Alshina et al., "CE3: Experimental results of DCTIF by Samsung", Joint Collaborative Team on Video Coding (JCT-VC) of ITU-T SG16 WP3 and ISO/IEC JTC1/SC29/WG11, 4th Meeting: Daegu, KR, Jan. 2011.

International Search Report and Written Opinion of ISA mailed Dec. 11, 2012.

K. Kondo et al., "Memory bandwidth reduction MC filter", Joint Collaborative Team on Video Coding (JCT-VC) of ITU-T SG16 WP3 and ISO/IEC JTC1/SC29/WG11, 5th Meeting, JCTVC-E129, pp. 1-13, Mar. 2011.

J. Lou et al., "Motorola Mobility's Adaptive Interpolation Filter", Joint Collaborative Team on Video Coding (JCT-VC) of ITU-T SG16 WP 3 and ISO/IEC JTC 1/SC 29/WG 11, 5th Meeting, JCTVC-E359, pp. 1-6, Mar. 2011.

K. Kondo et al., "CE3: Cross check for Toshiba's proposal (tool 2)", Joint Collaborative Team on Video Coding (JCT-VC) of ITU-T SG16 WP3 and ISO/IEC JTC1/SC29/WG11, 7th Meeting, JCTVC-G393, pp. 1-2, Nov. 2011.

V. Sze et al., "Investigation on Luma interpolation filters", Joint Collaborative Team on Video Coding (JCT-VC) of ITU-T SG16 WP3 and ISO/IEC JTC1/SC29/WG11, 4th Meeting, JCTVC-D266, pp. 1-8, Jan. 2011.

E. Nogues et al., "A Modified HEVC Decoder for Low Power Decoding", Computing Frontiers, pp. 1-6, May 2015.

S. Matsuo, "Improved Intra Angular Prediction by DCT-Based Interpolation Filter", 20th European Signal Processing Conference (EUSIPCO), IEEE, pp. 1568-1572, Aug. 2012.

Extended European Search Report mailed Jan. 25, 2016, by the European Patent Office in counterpart European Patent Application No. 12850808.2.

\* cited by examiner

Sub-pel MV

■ :Full-pel reference samples

☐ :4x4 MC reference block

▦ :Sub-pel reference samples
  interpolated by different
  interpolation filter

▤ :Sub-pel reference samples
  reinterpolated by DCT
  interpolation filter

FIG. 6
PRIOR ART

| A | $e_1$ | b |  | A |
|---|---|---|---|---|
| $e_1$ | $e_3$ | $e_2$ |  |  |
| c | $e_2$ | d |  | c |
|  |  |  |  |  |
| A |  | b |  | A |

Full-pel MV

■ :Full-pel reference samples

☐ :4x4 MC reference block

Full-pel MV

■ :Full-pel reference samples

☐ :4x4 MC reference block

▦ :Sub-pel reference samples interpolated by interpolation filter

Sub-pel MV

■ :Full-pel reference samples

☐ :4x4 MC reference block

▦ :Sub-pel reference samples
interpolated by interpolation filter

VIDEO ENCODING DEVICE, VIDEO ENCODING METHOD, AND PROGRAM

CROSS-REFERENCE TO RELATED PATENT APPLICATIONS

This application is a National Stage Entry of International Application No. PCT/JP2012/007222, filed Nov. 12, 2012, which claims priority from Japanese Patent Application No. 2011-256503, filed Nov. 24, 2011. The entire contents of the above-referenced applications are expressly incorporated herein by reference.

TECHNICAL FIELD

The present invention relates to a video encoding device that uses fractional pixel accuracy (sub-pel accuracy) motion compensation prediction based on a DCT interpolation filter, and particularly relates to a vector searcher in a video encoding device.

BACKGROUND ART

In a video encoding device that uses motion compensation prediction, there are two types of prediction signals, namely, an intra prediction signal and an inter prediction signal.

In inter prediction, a motion vector can be obtained With ¼ pel accuracy. FIG. 6 is an explanatory diagram depicting a pixel signal interpolation process in motion compensation prediction. In FIG. 6, A denotes a pixel signal of an integer pixel (full-pel) position, b, c, and d each denote a pixel signal of a sub-pel position with ½ pel accuracy, and $e_1$, $e_2$, and $e_3$ each denote a pixel signal of a sub-pel position with ¼ pel accuracy. Hereafter, "pixel signal" is simply referred to as "pixel".

Non Patent Literature (NPL) 1 discloses a video encoding technique that uses ¼ pel accuracy motion compensation prediction based on a DCT interpolation filter. FIG. 7 is a schematic diagram depicting motion compensation prediction based on a DCT interpolation filter.

A motion estimation unit based on the DCT interpolation filter (hereafter referred to as "motion estimation unit with DCT interpolation filter") 104 estimates a sub-pel accuracy motion vector, based on a given full-pel accuracy motion vector. The motion estimation unit with DCT interpolation filter 104 supplies the sub-pel accuracy motion vector and 16 pixels (prediction signal) around the position corresponding to the sub-pel accuracy motion vector, to a prediction parameter selector 105. The prediction parameter selector 105 compares signals of an input image (original signal) and the prediction signal, and determines prediction parameters. The prediction parameters include a reference frame, a motion compensation prediction direction, a motion compensation prediction partition, and the sub-pel accuracy motion vector.

FIGS. 8 and 9 are explanatory diagrams of an integer pixel accuracy motion vector (full-pel MV) and a fractional pixel accuracy motion vector (sub-pel MV). In FIGS. 8 and 9, the small rectangles represent ¼ reference pixels. The small black rectangles represent integer reference pixels (full-pel reference samples). The thick black line box represents a motion compensation reference block (4×4 MC reference block) of 4 pixels×4 pixels (full-pel accuracy).

Suppose a full-pel MV is given as indicated by the arrow in FIG. 8. The motion estimation unit with DCT interpolation filter 104 determines an optimum ¼ pixel accuracy motion vector from a range of a plurality of pixels (e.g. 49 pixels×49 pixels with ¼ pixel accuracy) centered at the given vector, and supplies the optimum ¼ pixel accuracy motion vector to the prediction parameter selector 105.

In order to determine the optimum ¼ pixel accuracy motion vector, the motion estimation unit with DCT interpolation filter 104 needs to compute the pixels of ¼ pixel accuracy for 49 pixels×49 pixels centered at the position of the full-pel MV, by interpolation.

The dotted pixels of ¼ pixel accuracy in FIG. 9 are pixels that are likely to be interpolated by the DCT interpolation filter. FIG. 10 depicts an example of the ¼ pixel accuracy motion vector.

The number of taps of the DCT interpolation filter disclosed in NPL 1 is 8. The DCT interpolation filter coefficients at the sub-pel position of ¼ are [−1, 4, −10, 57, 19, −7, 3, −1]/64, the DCT interpolation filter coefficients at the sub-pel position of 2/4 are [−1, 4, −11, 40, 40, −11, 4, −1]/64, and the DCT interpolation filter coefficients at the sub-pel position of ¾ are [−1, 3, −7, 19, 57, −10, 4, −1]/64.

CITATION LIST

Patent Literatures

PTL 1: Japanese Translation of PCT International Application Publication No. 2011-517241

PTL 2: Japanese Patent Application Laid-Open No. 2003-219426

Non Patent Literatures

NPL 1: Benjamin Bross, Woo-Jin Han, Jens-Rainer Ohm, Gary J. Sullivan, and Thomas Wiegand, "WD4: Working Draft 4 of High-Efficiency Video Coding", JCTVC-F803_d1, Joint Collaborative Team on Video Coding (JCT-VC) of ITU-T SG16 WP3 and ISO/IEC JTC1/SC29/WG11 6th Meeting: Torino, IT, 14-22 Jul. 2011.

NPL 2: Kenji Kondo and Teruhiko Suzuki, "CE3: Reports on MC boundary filter", JCTVC-F100, Joint Collaborative Team on Video Coding (JCT-VC) of ITU-T SG16 WP3 and ISO/IEC JTC1/SC29/WG11 6th Meeting: Torino, IT, 14-22 Jul. 2011.

SUMMARY OF INVENTION

Technical Problem

H.264/MPEG-4 AVC which is an existing video encoding standard uses ¼ pixel accuracy motion compensation prediction based on a 6-tap interpolation filter. The technique disclosed in NPL 1 uses the DCT interpolation filter with 8 taps, so that not only motion compensation prediction but also ¼ pixel accuracy motion vector estimation increases in complexity from H.264/MPEG-4 AVC. NPL 2 proposes the use of an 8-tap DCT interpolation filter of different coefficients for ¼ pixel accuracy motion vector estimation. However, since the number of taps is larger than 6, an increase in complexity of ¼ pixel accuracy motion vector estimation from H.264/MPEG-4 AVC cannot be avoided.

Patent Literatures (PTLs) 1 and 2 each describe a video encoding device having a plurality of types of interpolation filters. However, PTLs 1 and 2 each merely disclose a technique of using different interpolation filters according to situation.

The present invention has an object of avoiding an increase in complexity of motion vector estimation in a video encoding device that uses sub-pel accuracy motion compensation prediction.

Solution to Problem

A video encoding device according to the present invention is a video encoding device that uses fractional pixel accuracy motion compensation prediction based on a DCT interpolation filter, the video encoding device including: fractional pixel accuracy motion vector search means for estimating a fractional pixel accuracy motion vector using an interpolation filter different from the DCT interpolation filter; and fractional pixel accuracy motion compensation prediction signal update means for updating a prediction signal of a position of the fractional pixel accuracy motion vector estimated by the fractional pixel accuracy motion vector search means, by a prediction signal based on the DCT interpolation filter.

A video encoding method according to the present invention is a video encoding method that uses fractional pixel accuracy motion compensation prediction based on a DCT interpolation filter, the video encoding method including: estimating a fractional pixel accuracy motion vector using an interpolation filter different from the DCT interpolation filter; and updating a prediction signal of a position of the estimated fractional pixel accuracy motion vector, by a prediction signal based on the DCT interpolation filter.

A video encoding program according to the present invention is a video encoding program that uses fractional pixel accuracy motion compensation prediction based on a DCT interpolation filter, the video encoding program causing a computer to execute: a process of estimating a fractional pixel accuracy motion vector using an interpolation filter different from the DCT interpolation filter; and a process of updating a prediction signal of a position of the estimated fractional pixel accuracy motion vector, by a prediction signal based on the DCT interpolation filter.

Advantageous Effects of Invention

According to the present invention, both a decrease in compression performance and an increase in complexity can be avoided.

BRIEF DESCRIPTION OF DRAWINGS

Figure 6:
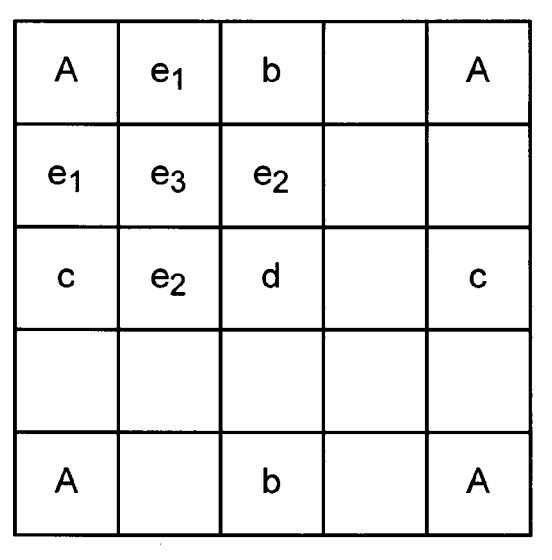

FIG. 6 It is an explanatory diagram depicting a pixel interpolation process in motion compensation prediction.

DESCRIPTION OF EMBODIMENT(S)

Figure 1:
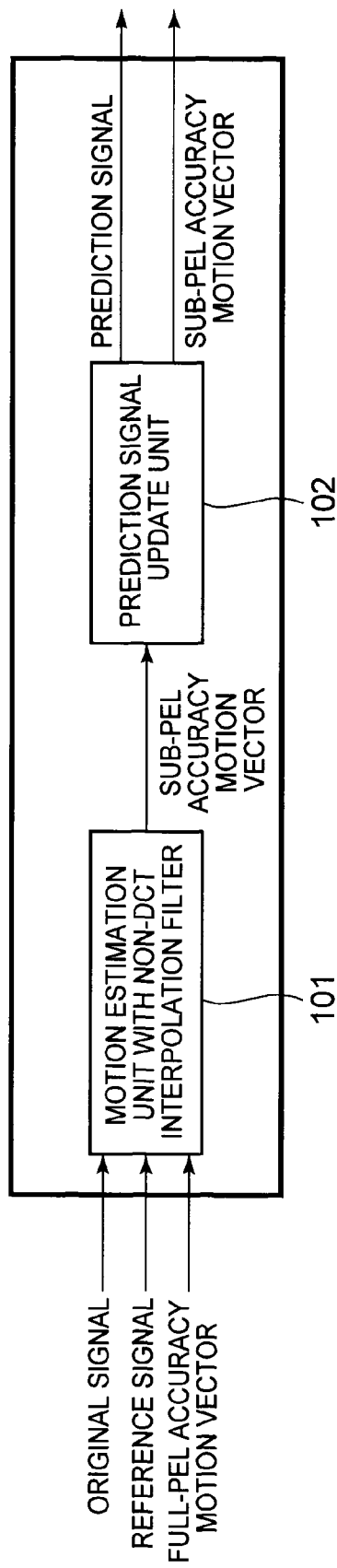
FIG. 1 It is a schematic diagram depicting motion compensation prediction based on a DCT interpolation filter in an exemplary embodiment of the present invention.

FIG. 1 is a schematic diagram depicting motion compensation prediction based on a DCT interpolation filter in an exemplary embodiment of the present invention. In this exemplary embodiment, a video encoding device uses an interpolation filter (hereafter referred to as "non-DCT interpolation filter") different from the interpolation filter of the motion estimation unit with DCT interpolation filter 104. A motion estimation unit based on the non-DCT interpolation filter is hereafter referred to as "motion estimation unit with non-DCT interpolation filter 101".

Figure 7:
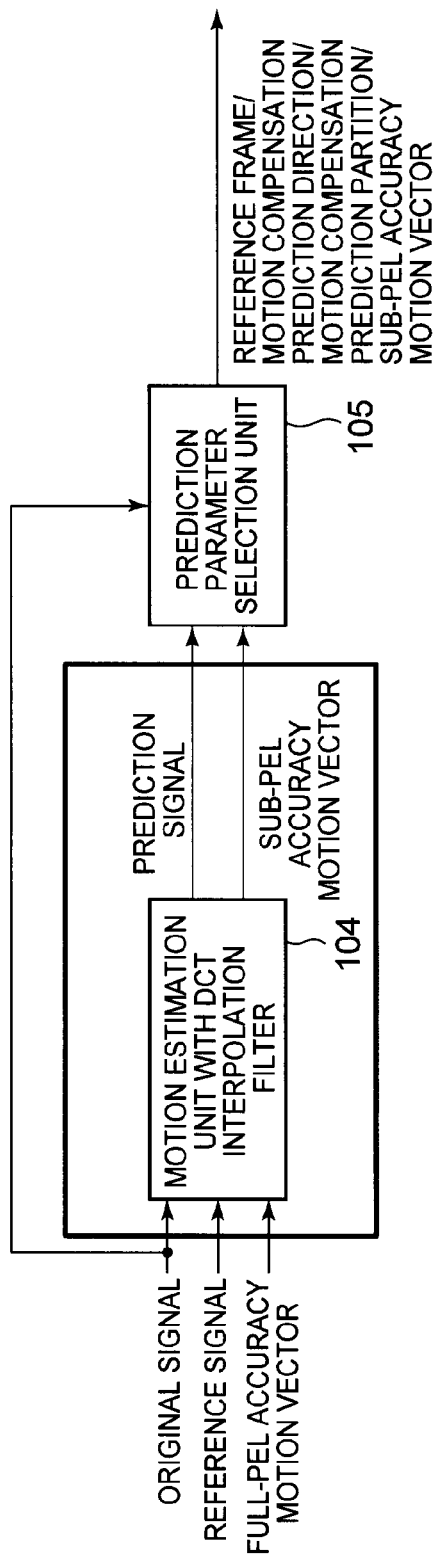
FIG. 7 It is a schematic diagram depicting motion compensation prediction based on a DCT interpolation filter.
Figure 8:
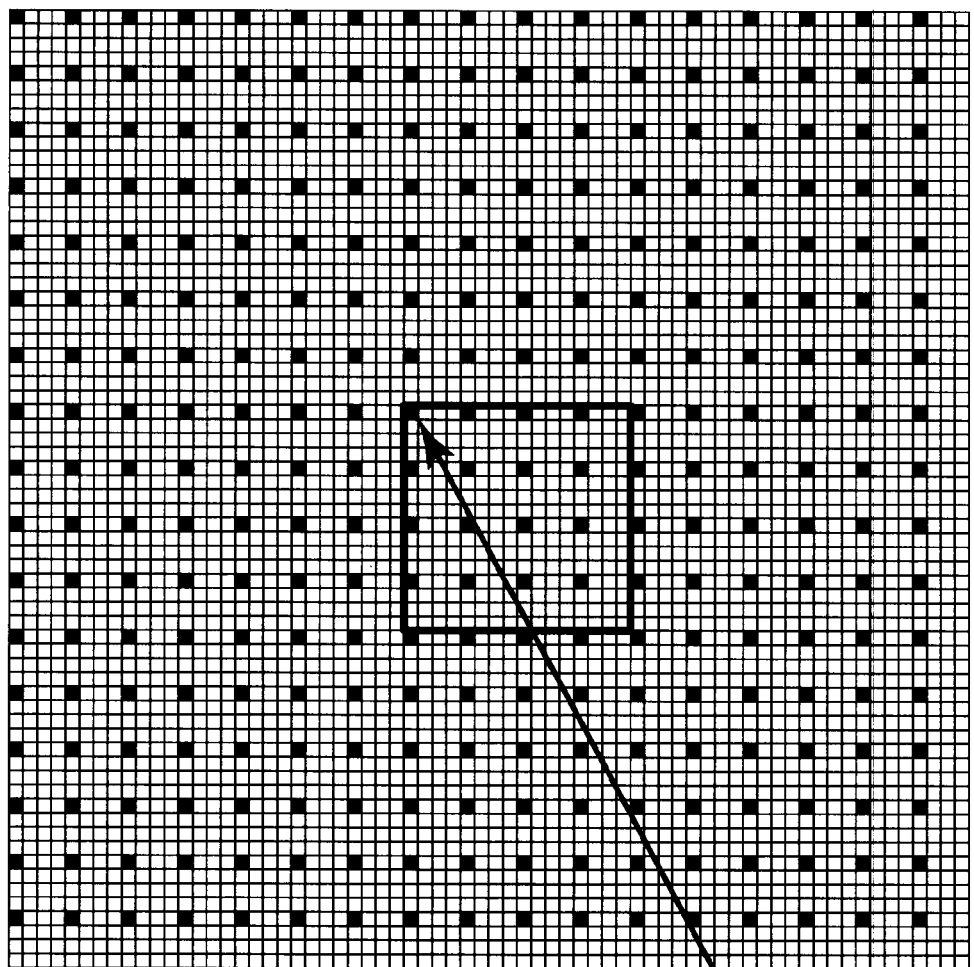
FIG. 8 It is an explanatory diagram of a full-pel accuracy motion vector (full-pel MV).
Figure 9:
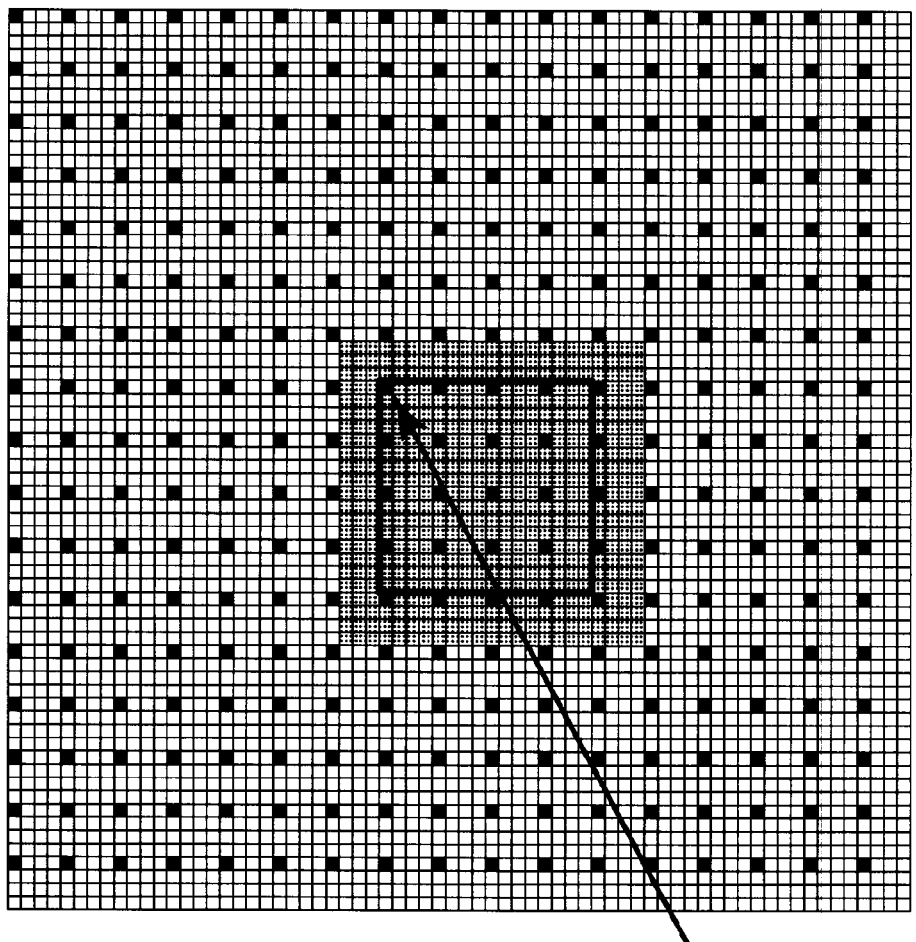
FIG. 9 It is an explanatory diagram of a sub-pel accuracy motion vector (sub-pel MV).
Figure 10:
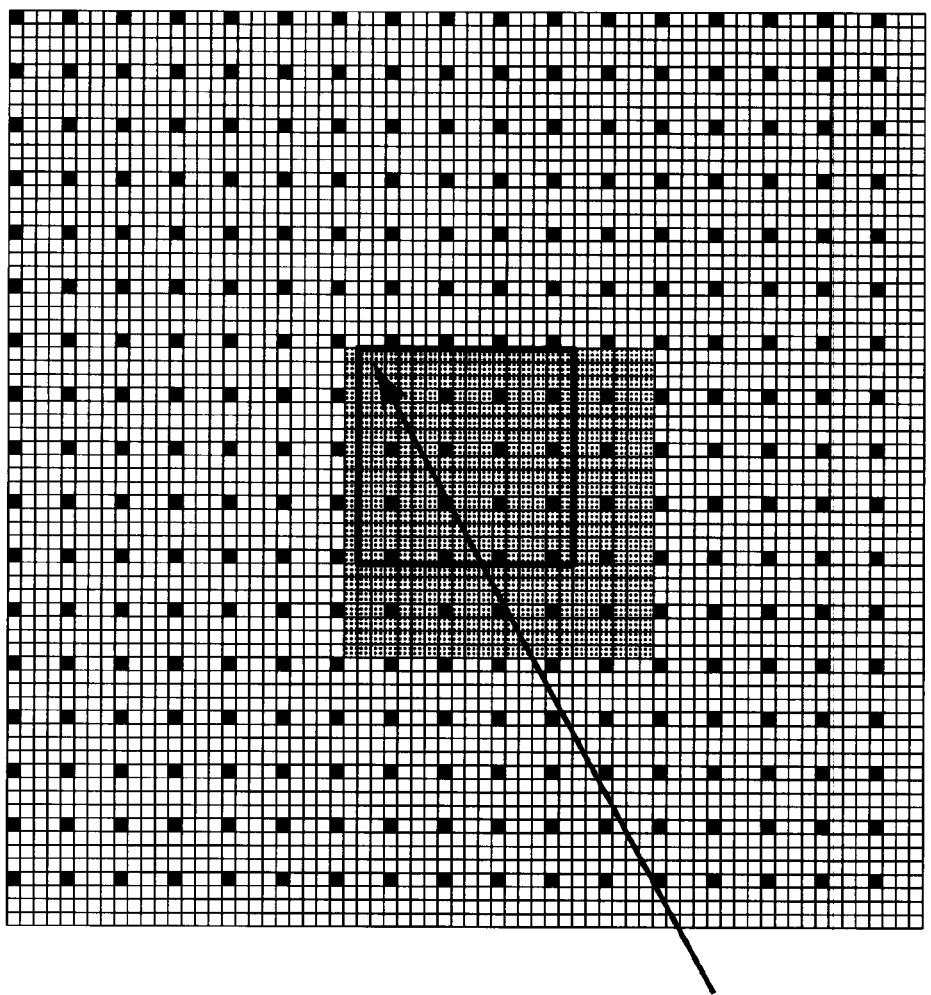
FIG. 10 It is an explanatory diagram depicting an example of a ¼ pixel accuracy motion vector.

As shown in FIG. 1, the video encoding device includes the motion estimation unit with non-DCT interpolation filter 101 and a prediction signal update unit 102, without using the motion estimation unit with DCT interpolation filter 104 in FIG. 7.

The motion estimation unit with non-DCT interpolation filter 101 computes pixels of ¼ pixel accuracy by interpolation, based on a full-pel MV. The motion estimation unit with non-DCT interpolation filter 101 determines an optimum ¼ pixel accuracy motion vector, and supplies the optimum ¼ pixel accuracy motion vector to the prediction signal update unit 102.

The non-DCT interpolation filter is different from the DCT interpolation filter of the motion estimation unit with DCT interpolation filter 104. The non-DCT interpolation filter is simply structured as compared with the DCT interpolation filter.

As an example, while the number of taps of the DCT interpolation filter is 8, the number of taps of the non-DCT interpolation filter is 6. In this case, for instance, the coefficients of the non-DCT interpolation filter are [1, −4, 27, 9, −3, 1]/32 at the sub-pel position of ¼, [1, −5, 20, 20, −5, 1]/32 at the sub-pel position of 2/4, and [1, −3, 9, 27, −4, 1]/32 at the sub-pel position of ¾.

The number of taps of the non-DCT interpolation filter may be 4. In this case, for instance, the coefficients of the non-DCT interpolation filter are [−2, −27, 8, −1]/32 at the sub-pel position of ¼, [−2, 18, 18, −2]/32 at the sub-pel position of 2/4, and [−1, 8, 27, −2]/32 at the sub-pel position of ¾.

The prediction signal update unit 102 interpolates pixels of the position of the ¼ pixel accuracy motion vector from neighboring pixels, by the same process as the DCT interpolation filter of the motion estimation unit with DCT interpolation filter 104 in FIG. 7. That is, the prediction signal update unit 102 updates a pixel of the position of the ¼ pixel accuracy motion vector, by a prediction signal based on the DCT interpolation filter.

Figure 2:
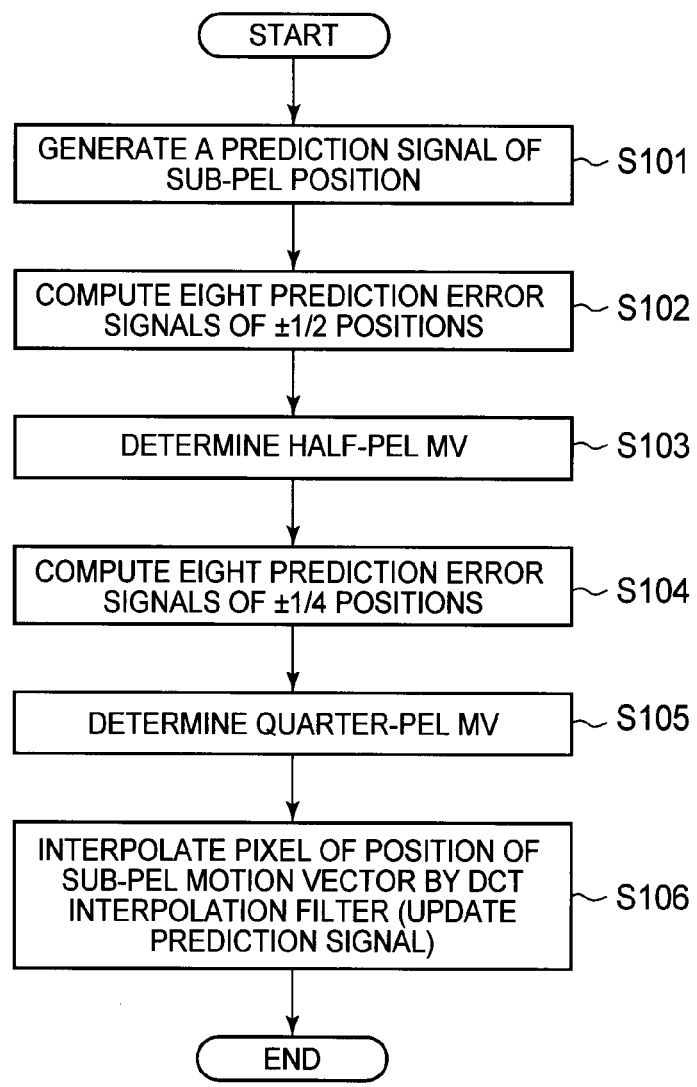
FIG. 2 It is a flowchart depicting motion compensation prediction in the exemplary embodiment.
Figure 3:
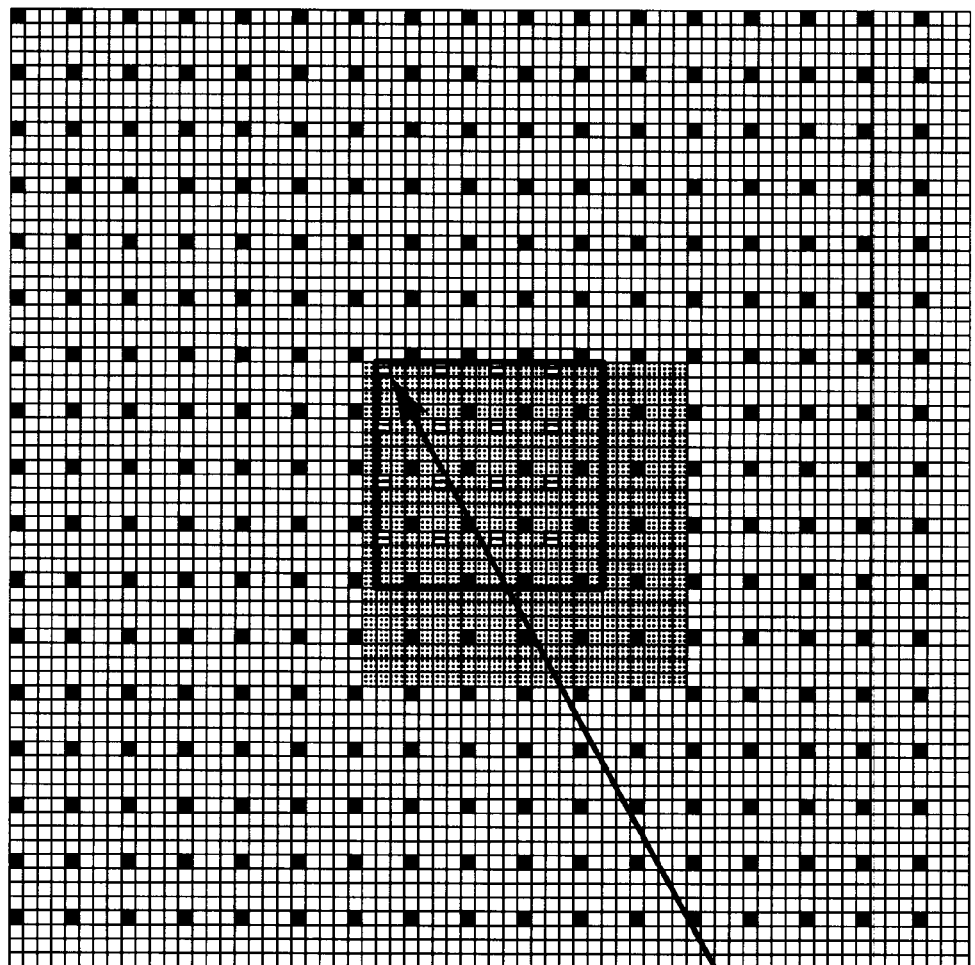
FIG. 3 It is an explanatory diagram of a sub-pel accuracy motion vector (sub-pel MV).

FIG. 2 is a flowchart depicting motion compensation prediction in this exemplary embodiment. FIG. 3 is an explanatory diagram of a sub-pel accuracy motion vector (sub-pel MV). The dotted pixels of ¼ pixel accuracy in FIG. 3 are pixels that are likely to be interpolated by the non-DCT interpolation filter.

Motion compensation prediction in this exemplary embodiment is described below, with reference to FIGS. 2 and 3.

In step S101, the motion estimation unit with non-DCT interpolation filter 101 interpolates sub-pel pixels around the position of the given full-pel MV, by the non-DCT interpolation filter. That is, the motion estimation unit with non-DCT interpolation filter 101 generates a prediction signal of sub-pel positions.

Next, in step S102, the motion estimation unit with non-DCT interpolation filter 101 computes a prediction error signal [(signal)−(prediction signal)] of each of eight sub-pel positions of ±½ (±½ between full-pel pixels, i.e. pixels apart by ±2 in ¼ pixel accuracy) centered at the position of the given full-pel MV.

Next, in step S103, the motion estimation unit with non-DCT interpolation filter 101 sets a sub-pel position of a minimum value of the eight prediction error signals, as a half-pel MV (½ pixel accuracy motion vector).

Next, in step S104, the motion estimation unit with non-DCT interpolation filter 101 computes a prediction error signal of each of eight sub-pel positions of ±¼ (±¼ between full-pel pixels, i.e. adjacent pixels in ¼ pixel accuracy) centered at the position of the half-pel MV.

Further, in step S105, the motion estimation unit with non-DCT interpolation filter 101 sets a sub-pel position of a minimum value of the eight prediction error signals, as a quarter-pel MV (¼ pixel accuracy motion vector). The motion estimation unit with non-DCT interpolation filter 101 supplies the quarter-pel MV to the prediction signal update unit 102, as a sub-pel accuracy motion vector.

In step S106, the prediction signal update unit 102 re-interpolates a pixel of the position of the quarter-pel MV, by the 8-tap DCT interpolation filter. That is, the prediction signal update unit 102 updates a prediction signal of the position of the quarter-pel MV, with a pixel interpolated by the DCT interpolation filter.

In the case where the sub-pel MV (specifically, the quarter-pel MV) is determined as shown in FIG. 3 as an example, the hatched pixels in FIG. 3 are pixels for which prediction signals are updated by the prediction signal update unit 102.

After this, the prediction signal update unit 102 supplies the ¼ pixel accuracy motion vector and the prediction signals (including the updated prediction signals) to a prediction parameter selector (see FIG. 7).

In this exemplary embodiment, in the video encoding device, sub-pel accuracy motion vector search means estimates a sub-pel accuracy motion vector using an interpolation filter (the interpolation filter of the motion estimation unit with non-DCT interpolation filter 101 in FIG. 1) having a smaller number of taps than a DCT interpolation filter (the interpolation filter of the motion estimation unit with DCT interpolation filter 104 in FIG. 7) for sub-pel accuracy motion compensation prediction. Accordingly, an increase in complexity of ¼ pixel accuracy motion vector estimation from H.264/MPEG-4 AVC is avoided.

Moreover, sub-pel accuracy motion compensation prediction signal update means updates a prediction signal of the estimated sub-pel accuracy motion vector, by a prediction signal based on the DCT interpolation filter. Errors in selecting a reference frame, a motion compensation prediction direction, and a motion compensation prediction partition are thus suppressed. This is because, in the case where the process executed after the process of sub-pel accuracy motion compensation prediction in the video encoding device is predicated on the generation of a prediction signal by the 8-tap DCT interpolation filter, executing step S106 eliminates any contradiction between these processes.

The above exemplary embodiment may be realized by hardware, or realized by a computer program.

Figure 4:
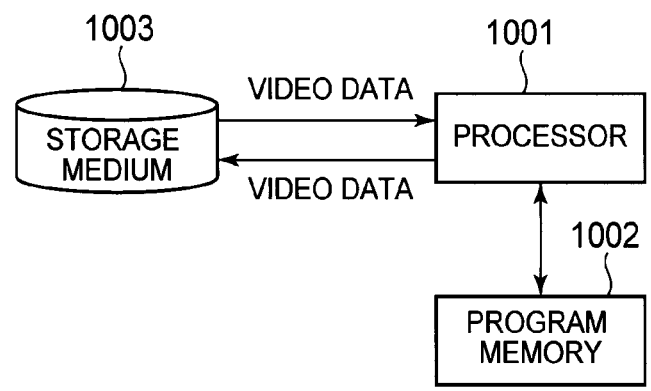
FIG. 4 It is a block diagram depicting an example of a structure of an information processing system capable of realizing functions of a video encoding device according to the present invention.

An information processing system in FIG. 4 includes a processor 1001, a program memory 1002, and a storage medium 1003 for storing video data (an input image and a reference image). As the storage medium, a magnetic storage medium such as a hard disk is available.

In the information processing system in FIG. 4, a program for realizing the functions shown in FIG. 1 is stored in the program memory 1002. The processor 1001 realizes the functions of the video encoding device in FIG. 1, by executing processes according to the program stored in the program memory 1002.

Figure 5:
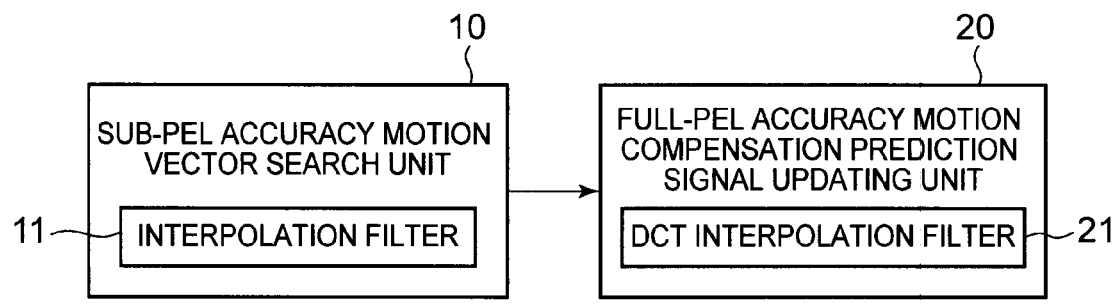
FIG. 5 It is a block diagram depicting a main part of a video encoding device according to the present invention.

FIG. 5 is a block diagram depicting a main part of a video encoding device according to the present invention. As shown in FIG. 5, the video encoding device according to the present invention includes: a sub-pel accuracy motion vector search unit (e.g. the motion estimation unit with non-DCT interpolation filter 101 in FIG. 1) 10 for estimating a sub-pel accuracy motion vector using an interpolation filter (e.g. the non-DCT interpolation filter of the motion estimation unit with non-DCT interpolation filter 101 in FIG. 1) 11 different from a DCT interpolation filter (e.g. the DCT interpolation filter of the motion estimation unit with DCT interpolation filter 104 in FIG. 7) 21; and a sub-pel accuracy motion compensation prediction signal updating unit (e.g. the prediction signal update unit 102 in FIG. 1) 20 for updating a prediction signal of a position of the sub-pel accuracy motion vector estimated by the sub-pel accuracy motion vector search unit 10, by a prediction signal based on the DCT interpolation filter 21.

Though the present invention has been described with reference to the above exemplary embodiment and examples, the present invention is not limited to the above exemplary embodiment and examples. Various changes understandable by those skilled in the art can be made to the structures and details of the present invention within the scope of the present invention.

This application claims priority based on Japanese Patent Application No. 2011-256503 filed on Nov. 24, 2011, the disclosure of which is incorporated herein in its entirety.

REFERENCE SIGNS LIST

10 sub-pel accuracy motion vector search unit
11 interpolation filter
20 sub-pel accuracy motion compensation prediction signal updating unit
21 DCT interpolation filter
101 motion estimation unit with non-DCT interpolation filter
102 prediction signal update unit
104 motion estimation unit with DCT interpolation filter
105 prediction parameter selector
1001 processor
1002 program memory
1003 storage medium

The invention claimed is:

1. A video encoding device that uses fractional pixel accuracy motion compensation prediction based on a DCT interpolation filter, the video encoding device comprising:
a memory storing instructions; and
a processor configured to execute the instructions to:
estimate a fractional pixel accuracy motion vector using an interpolation filter different from the DCT interpolation filter; and
update a prediction signal of a position of the estimated fractional pixel accuracy motion vector, by a prediction signal based on the DCT interpolation filter;
wherein coefficients of the interpolation filter different from the DCT interpolation filter are [1, −4, 27, 9, −3, 1]/32 or [−2, −27, 8, −1]/32 at a fractional pixel position of 1/4, [1, −5, 20, 20, −5, 1]/32 or [−2, 18, 18, −2]/32 at a fractional pixel position of 2/4, and [1, −3, 9, 27, −4, 1]/32 or [−1, 8, 27, −2]/32 at a fractional pixel position of 3/4.

2. A video encoding method that uses fractional pixel accuracy motion compensation prediction based on a DCT interpolation filter, the video encoding method comprising:

estimating a fractional pixel accuracy motion vector using an interpolation filter different from the DCT interpolation filter; and updating a prediction signal of a position of the estimated fractional pixel accuracy motion vector, by a prediction signal based on the DCT interpolation filter;

wherein coefficients of the interpolation filter different from the DCT interpolation filter are [1, −4, 27, 9, −3, 1]/32 or [−2, −27, 8, −1]/32 at a fractional pixel position of 1/4, [1, −5, 20, 20, −5, 1]/32 or [−2, 18, 18, −2]/32 at a fractional pixel position of 2/4, and [1, −3, 9, 27, −4, 1]/32 or [−1, 8, 27, −2]/32 at a fractional pixel position of 3/4.

3. A non-transitory computer readable information recording medium storing a video encoding program that uses fractional pixel accuracy motion compensation prediction based on a DCT interpolation filter, when executed by a processor, performs a method for:

estimating a fractional pixel accuracy motion vector using an interpolation filter different from the DCT interpolation filter; and updating a prediction signal of a position of the estimated fractional pixel accuracy motion vector, by a prediction signal based on the DCT interpolation filter;

wherein coefficients of the interpolation filter different from the DCT interpolation filter are [1, −4, 27, 9, −3, 1]/32 or [−2, −27, 8, −1]/32 at a fractional pixel position of 1/4, [1, −5, 20, 20, −5, 1]/32 or [−2, 18, 18, −2]/32 at a fractional pixel position of 2/4, and [1, −3, 9, 27, −4, 1]/32 or [−1, 8, 27, −2]/32 at a fractional pixel position of 3/4.

* * * * *